United States Patent

Tomalia et al.

[15] 3,673,274
[45] June 27, 1972

[54] POLYMERIC ADHESIVE CONTAINING A POLYEPOXIDE, A CARBOXY TERMINATED POLYBUTADIENE AND A BIS-2-OXAZOLINE

[72] Inventors: Donald A. Tomalia; William K. Glesner, both of Midland, Mich.

[73] Assignee: The Dow Chemical Company, Midland, Mich.

[22] Filed: March 29, 1971

[21] Appl. No.: 129,253

[52] U.S. Cl..........................260/836, 161/184, 161/185 M, 161/186, 260/47 EN, 260/837 R, 260/879
[51] Int. Cl.................................................C08g 45/04
[58] Field of Search .........................260/836, 837

[56] References Cited

UNITED STATES PATENTS

| | | | |
|---|---|---|---|
| 2,947,338 | 8/1960 | Reid | 260/837 |
| 3,312,754 | 4/1967 | Marks | 260/837 |
| 3,324,198 | 6/1967 | Gruver | 260/837 |
| 3,476,712 | 11/1969 | Fukui | 260/78 |
| 3,509,231 | 4/1970 | Ranck | 260/837 |
| 3,580,830 | 5/1971 | Siebert | 260/837 |

OTHER PUBLICATIONS

Drake, R. S. et al. Liquid Budadiene/Acrylonitrile Polymers With Reactive Terminals, Rubber World, October 1968, Pages 51–56

*Primary Examiner*—Paul Lieberman
*Attorney*—Griswold & Burdick, R. G. Brookens and A. R. Lindstrom

[57] ABSTRACT

Polymeric adhesive compositions comprising essentially stoichiometric amounts of (1) a poly 1,2-epoxyalkyl compound having an average of more than one 1,2-epoxyaliphatic group per molecule, (2) a bis-2-oxazoline or bis-2-oxazine and (3) a carboxyl terminated polybutadiene of the formula

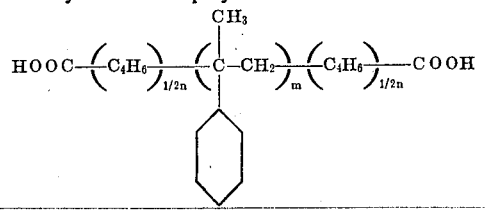

where $n$ has an average value of from 2 to about 150, $m$ has a value from 3 to 6 and is principally 4.

3 Claims, No Drawings

POLYMERIC ADHESIVE CONTAINING A POLYEPOXIDE, A CARBOXY TERMINATED POLYBUTADIENE AND A BIS-2-OXAZOLINE

BACKGROUND OF THE INVENTION

1. Field of the Invention

This invention pertains to polymeric adhesives, optionally thermoplastic, solvent-soluble, and pressure-sensitive; alternatively or successively, insoluble, rigid, thermoset adhesives.

2. The Prior Art

No prior art is known which is particularly close to the instant invention in starting materials, procedures, or product. U.S. Pat. No. 3,476,712 describes the process of making solid polymers using two reactants which could be thought of as relatively close to the present invention, but which product polymers possess essentially none of adhesive properties which are essential and critical in the present invention.

DESCRIPTION OF THE PRESENT INVENTION

According to the present invention, essentially stoichiometric amounts of a polyepoxide capable of being cured to obtain an epoxy resin, a bis-2-oxazoline or bis-2-oxazine compound, and a dicarboxyl terminated polybutadiene are mixed and blended together, and gently heated, at a temperature which can be 120° C. for a period of time which can be 15–20 minutes, to obtain a highly desirable pressure-sensitive adhesive characterized by: excellent elasticity, the capability (depending upon backing material) of adhering essentially unremovably to a plastic film backing, and of adhering removably but with remarkable strength to surfaces of wood, glass, polymeric materials including polyethylene, polyesters, and polytetrafluoroethylene, and to metals including aluminum, steel, and nickel and to concrete. When it is desired to have a solvent-insoluble, thermoset, tough but rigid adhesive, either the thermoplastic pressure sensitive adhesive above described is heated further, such as for an hour or more at 150° C. or higher; or, alternatively, the starting materials are mixed and blended together and the entire mixture is elevated to an initial temperature of 150° C. or so and heated thereat for a period of time sufficient to convert the resulting product into a thermoset adhesive.

The polyepoxide to be employed according to this invention is any curable polyepoxide, preferably a poly-1,2-epoxyalkyl compound having an average of more than one 1,2-epoxyalkyl group per molecule. The substances of this definition that are set forth in "Handbook of Epoxy Resins" (McGraw-Hill, New York, 1967) by Lee and Neville, are illustrative.

Particularly preferred polyepoxides include the commercial mixture which is commonly thought of as the diglycidyl ether of bisphenol A, usually prepared by the reaction of epichlorohydrin with bisphenol A in the presence of base. However, highly desirable results are also obtained, and are relevant to the employment of the present adhesive in a situation of fire hazard, when the poly-brominated diglycidyl ether of bisphenol A is employed. When denser cross-linking is desired, and with minor adjustments in exact proportions, based upon simple range-finding tests which are carried out at the time the application is under study, the epoxy novolacs are of great value and use according to this invention. In another embodiment, the epoxy-terminated polyglycols are employed with excellent results. The employment of such epoxy-terminated polyglycols tends to yield products which are somewhat more flexible.

Moreover, this invention is not restricted to the employment of a single polyepoxide starting material, but contemplates blends of such materials such as a blend of approximately one-half of the liquid diglycidyl ether of bisphenol A, together with ¼-part epoxy novolac, and ¼-part epoxy terminated polyglycol.

Also, when it is desired to control viscosity, reactive diluents such as butyl glycidyl ether, phenyl glycidyl ether, and the like can be mixed into and blended with the mixture according to this invention.

The bis-2-oxazoline or bis-2-oxazine compound to be employed is any compound wherein the oxazoline groups or oxazine groups are bonded together through an alkylene, an oxyalkylene, or a thioalkylene group or chain of such groups.

A preferred group of such compounds is that wherein the oxazine or oxazoline groups are bonded together through an alkylene, oxyalkylene, or thioalkylene, in which any alkylene, oxyalkylene or thioalkylene group is of from one to three, both inclusive, carbon atoms; or in which the oxazoline or oxazine groups are bonded together through a chain of up to about fifty alkylene, oxyalkylene or thioalkylene groups, in which chain any alkylene, oxyalkylene, or thioalkylene group is of from two to four, both inclusive, carbon atoms.

Exemplary of particularly preferred bis-2-oxazolines or bis-2-oxazines are those of the formula

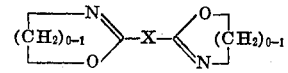

wherein X is one of the divalent moieties

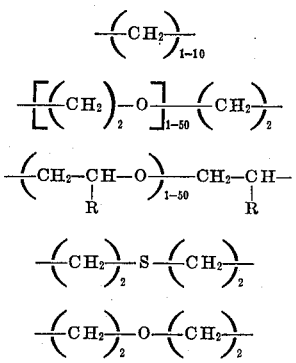

wherein R is alkyl of from one to three, both inclusive, carbon atoms; or where X is

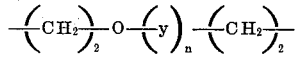

where y represents ethyleneoxy or propyleneoxy and n is an integer from 1 to about 50.

The above bis-2-oxazoline and oxazine compounds are prepared by any of a group of synthetic routes all of which pass, advantageously, through a cyano group; in the sense that, at each molecular site where an oxazine or oxazoline heterocycle is desired, there is provided as a precursor site, a cyano. From such site it is, in general, convenient and easy to go on to the desired heterocycle. The only condition believed to be limiting is that, with respect to the reactions that go on from the cyano to the heterocycle, preferably the cyano be the most reactive or only significantly reactive site; or, if any other site on the starting cyano compound be more reactive than cyano, then known alternative procedures must be considered. Such procedures are described in U.S. Pat. No. 3,563,920, issued Feb. 16, 1971.

It is to be understood that mixed starting materials can be used to give mixed products all within the single class, or genus, of such compounds as hereinbefore set forth, and all will function as indicated. Stoichiometry of starting materials can be permitted to vary in such fashion that substantially more, or somewhat fewer, average, oxazine or oxazoline heterocycles appear, per molecule, than precisely two as above indicated and will function as indicated. Similarly, the position isomery of substituents (but not within the nuclear structure of the oxazine or oxazoline moieties) may vary widely without impairing the products of this invention.

The carboxyl terminated polybutadienes to be employed according to this invention are more precisely a block copolymer of α-methylstyrene doubly terminated by blocks of polybutadiene which are, themselves, each carboxyl terminated. These are fully set forth in U.S. Pat. No. 3,346,666 and, in particular, any of the embodiments there set forth can be employed. For convenience, any of these materials is hereinafter called a carboxylated polybutadiene. Particularly useful are the carboxylated polybutadienes of the formula

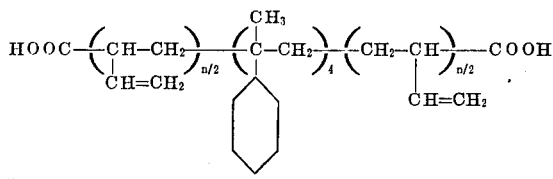

wherein the functionalized polybutadiene has a DP of from about 8 to 110.

It is routine in the art to ascertain the actual functional group equivalent weight of a curable or reactive substance; thus, the polyepoxide commonly regarded as the diglycidyl ether of bisphenol A, seldom has a functionality as high as an average of two per molecule, the theoretically perfect molecule. In calculating amounts to be employed to prepare the adhesive compositions of this invention, the functionalities of the various starting materials — bis-2-oxazoline or bis-2-oxazine, epoxide, and carboxyl terminated polybutadiene — are first ascertained.

These substances are then combined, in those quantities which provide substantially equal amounts of each of the three kinds of reactive moieties, subject always to the understanding that, in each molecule presenting such active moiety, the average number is higher than one, and preferably approaches or somewhat exceeds two. Making the assumption that each oxazine or oxazoline, each oxirane, and each carboxyl react in whatever reaction gives rise to the present adhesive, stoichiometric amounts are to be employed. As is customary, modest departures from theoretically perfect stoichiometric amounts are not usually a source of difficulty.

When the amounts of starting materials have been chosen, these substances are combined, and for convenience may simply be weighed into a reaction vessel. There they are intimately mixed and stirred to provide a homogeneous mixture. Thereafter, the contents of the reaction vessel is heated at a temperature adapted to obtain a partial reaction of the starting materials, typically a period of time from 5 to 30 minutes, and a temperature, generally inversely dependent upon time, of from 75° to 150° C. Within this range, a temperature of 120° C. and 20 minutes is regarded as the best reaction conditions.

As reaction takes place, the viscosity of the mixture increases dramatically, and if stirring means are employed during the heating process, care must be taken lest they stall. The product obtained upon completion of such heating with increase of viscosity is the pressure sensitive adhesive of this invention.

Because the resulting solvent-soluble, thermoplastic pressure sensitive adhesive is not believed to be of, or to depend upon having, a strict chemical identity, there is no single, sharply defined end point to be observed. In general, the increase in viscosity which can be ascertained by informal challenges with a stirring rod, during the heating process. With higher temperatures or longer heating, a somewhat more viscous material is obtained; with shorter heating or lower temperatures or both, a somewhat less viscous material is obtained; the desirable pressure-sensitive adhesive properties are widely distributed across a spectrum of products thus achieved.

When the pressure-sensitive thermoplastic and solvent-soluble adhesive is achieved, it is characterized by the fact that it is cold drawn into filaments as from a stirring rod. The material is also very readily soluble in asymmetric lower alkyl ketones, moderately soluble in dimethylformamide and tetrahydrofuran, and nearly insoluble in acetone.

In contrast, the polymer achieved by any subcombination or any two of the three necessary starting materials is of such distinctly inferior adhesive and other properties as to be essentially useless (as shown by Examples 2 and 3, infra).

Because of the pressure-sensitive behavior of the adhesive prepared in the manner above described, the adhesive tends also to be temporary and, depending upon the surfaces which it holds together, may, together with one of two surfaces thus joined, be subject to removal by tension, stripping, and the like.

When it is desired to render the adhesive function more nearly permanent, the pressure-sensitive thermoplastic material is readily converted, if desired, to a solvent resistant, thermoset, hard adhesive material. To achieve this, in one manner, the pressure sensitive adhesive as described is applied and the surfaces to be held together are brought together. In this situation, the adherent surfaces together with pressure-sensitive cement holding them together are heated until set, as, for example, for an hour at 160° C.; whereupon the thermoplastic, solvent-soluble, pressure-sensitive adhesive becomes a permanent, essentially insoluble, hard, closely adherent adhesive composition of excellent properties.

In an alternative procedure, the bis-2-oxazine or oxazoline, the polyepoxide, and the dicarboxylic terminated polybutadiene are brought together and intimately mixed and stirred, and in this condition are applied to and between surfaces which are to be held together permanently, and heating for an hour or longer at 160° C. is carried out. In this situation, a hard, adherent intractable adhesive is produced without stopping at an intermediate pressure-sensitive adhesive stage.

In the production of the permanent, solvent-resistant adhesive, as here described, again, time and temperature are mutually, but in general, reciprocally, dependent. The employment of higher temperatures, such as up to 200° C. may, depending upon the environment, be accompanied by incipient degradation; in contrast, when curing temperatures as low as 120° C. are employed exaggerated curing times may be necessary. Within this range, durations of heating which achieve the final cure to the solvent-resistant, thermoset adhesive can be chosen; a period of 1 to 2 hours, at about 160° C., represents the best practice of curing to the permanent adhesive now known to the inventors. The best modes known to the inventors of practicing this invention are set out in the examples which follow:

EXAMPLE 1

This example sets forth pressure-sensitive adhesives which are the reaction product of a polyepoxide based upon the diglycidyl ether of bisphenol A; 2,2'(thiodiethylenebis)2-oxazoline; and a carboxylated polybutadiene of the structure

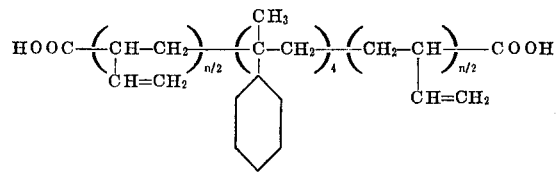

having a degree of polymerization (DP) of 44.

Each material was either of known functional equivalent weight or was analyzed for functional equivalent weight, and amounts employed were chosen upon that basis.

1.89 Grams, 0.01 equivalent weight of a commercial polyepoxide based upon the diglycidyl ether or bisphenol A ("D.E.R. 331"), 15.1 grams, 0.01 equivalent of the carboxylated polybutadiene, the equivalency being calculated upon the basis of 0.66 carboxyl equivalents per gram, and 1.14 grams, 0.01 equivalent of 2,2'-(thiodiethylenebis)2-oxazoline were combined together in a beaker, and thoroughly mixed and stirred to obtain a homogeneous mixture. This homogeneous mixture was then heated at 120° C. for a period of 20 minutes duration. During this time, the viscosity of the mixture increased dramatically, giving rise to a pale yellow, elastic polymer. When cooled, this polymer could readily be drawn into long, characteristically tapering filaments from a stirring rod inserted into the mass of polymer.

The polymer was studied and found to be readily soluble in methyl ethyl ketone, moderately soluble in dimethyl formamide and tetrahydrofuran, and nearly insoluble in acetone.

The material was applied to and tested for pressure sensitive adhesive properties in conjunction with, and found to be excellent in the case of each of wood, glass, portland cement concrete, aluminum, steel, nickel, polyethylene, polytetrafluoroethylene, and a commercial polyester which is substantially the polypropylene glycol ester of terephthalic acid.

EXAMPLE 2

Example 1 was repeated except that the carboxylated polybutadiene was omitted, giving rise to the incomplete reaction product of the polyepoxide and the oxazoline. The resulting product had so little adhesive value that it was not deemed to be of use as an adhesive.

EXAMPLE 3

Example 1 was again repeated except that the oxazoline was omitted, and the resulting incomplete reaction product of the polyepoxide and the carboxylated polybutadiene was examined. It was not deemed to be a feasible pressure-sensitive adhesive.

EXAMPLE 4

The pressure-sensitive adhesive product of Example 1 was applied to various surfaces, and to the exposed surface of the pressure-sensitive adhesive, a second surface was applied, giving rise to a "sandwich" construction which, in each instance, was then further heated for 1 hour at 160° C. to provide a permanent, solvent-resistant, thermoset adhesive. In this application, the early green adhesive strength was recognized as a distinct asset.

In this procedure, excellent permanent bonds were produced between stainless steel, aluminum, glass and wood in various combinations. The stainless steel sample was examined by a standard climbing drum peel test, and gave a pull measure of 102 pounds per inch width.

By way of comparison, when substantially the same procedures were employed, with the product of Example 2, a climbing drum peel test of 7 pounds per inch width was achieved.

When substantially the same procedures were employed with the product of Example 3, a climbing drum peel test of 4 pounds per inch width was achieved.

EXAMPLE 5

The procedures of Example 1 were repeated using the same ingredients except that the carboxylated polybutadiene utilized had a degree of polymerization of 14. The resulting product was a very effective pressure-sensitive adhesive when applied to the substrates as set forth in Example 1. In addition, further curing of this material, by the procedures as set forth in Example 4, provided a thermoset, solvent-resistant bond with a climbing drum peel test of 85 pounds per inch width.

EXAMPLE 6

The procedures of Example 1 were again repeated using the same ingredients except that the carboxylated polybutadiene utilized had a degree of polymerization of 104. The resulting product was also a very effective pressure-sensitive adhesive when applied to the substrates as set forth in Example 1. Additional curing of this material, by the procedures as set forth in Example 4, produced a thermoset, solvent-resistant bond with a climbing drum peel test of 50 pounds per inch width.

EXAMPLE 7

The procedures of Example 1 were repeated using the same epoxy resin in combination with essentially stoichiometric amounts of 2,2'-(oxydiethylenebis)2-oxazoline and wherein the carboxylated polybutadiene had a degree of polymerization of 48. The resulting product was a very effective pressure-sensitive adhesive when applied to the substrates as set forth in Example 1. Further, curing of this material, by the procedures as set forth in Example 4, provided a thermoset, solvent-resistant bond with a climbing drum peel test of 79 pounds per inch width.

EXAMPLE 8

The procedures of Example 1 were repeated using the same epoxy resin and carboxylated polybutadiene (DP of 44) in combination with essentially stoichiometric amounts of 2,2'(hexamethylenebis)2-oxazoline. The resulting product was a very effective pressure-sensitive adhesive when applied to the substrates as set forth in Example 1.

EXAMPLE 9

The procedures of Example 1 were repeated using the same epoxy resin and carboxylated polybutadiene in combination with a bis-2-oxazoline of the formula

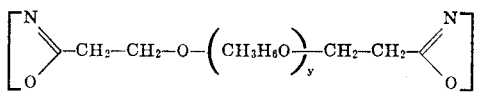

wherein $y$ has an average value of about 6.4.

The resulting product was a very effective pressure-sensitive adhesive when applied to the substrates as set forth in Example 1.

EXAMPLE 10

In each of a series of experiments, the procedures of Example 1 were repeated using the same epoxy resin in combination with 2,2'(thiodiethylenebis)2-oxazoline and as a replacement for the carboxylated polybutadiene, one of the following carboxylated copolymers.

Comparison A: A vinyl chloride/acrylic acid copolymer containing 18 weight percent acrylic acid;

Comparison B: A copolymer of 60 weight percent methacrylic acid and 40 weight percent styrene;

Comparison C: A copolymer of 30 weight percent methacrylic acid and 70 weight percent styrene; and Comparison D: An ethylene terpolymer containing 8 weight percent acrylic acid and 24 weight percent methylmethacrylate.

In each of the above instances, the resulting mixtures were granular in nature and failed to exhibit any useful adhesive properties when applied to substrates as set forth in Example 1.

What is claimed is:

1. Polymeric adhesive compositions comprising essentially stoichiometric amounts of (1) a poly 1,2-epoxyalkyl compound having an average of more than one 1,2-epoxyaliphatic group per molecule, (2) a bis-2-oxazoline or bis-2-oxazine of the formula

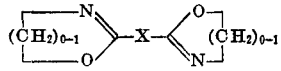

wherein X is one of the divalent moieties

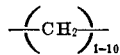

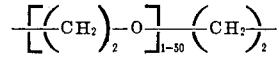

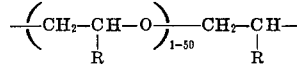

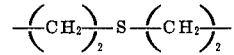

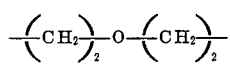

wherein R is alkyl of from one to three, both inclusive, carbon atoms; or where X is

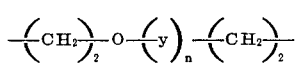

where $y$ represents ethyleneoxy or propyleneoxy and $n$ is an integer from 1 to about 50, and (3) a carboxylated polybutadiene of the formula

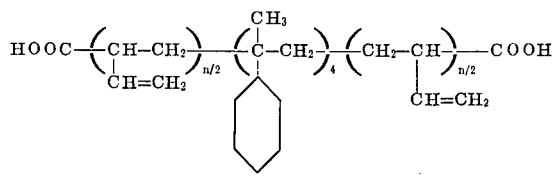

where $n$ has an average value of from 2 to about 150 and $m$ has a value from 3 to 6 and is principally 4.

2. The composition of claim 1 wherein said bis-2-oxazoline is selected from the group consisting of 2,2′(thiodiethylenebis)-2-oxazoline, 2,2′(hexamethylenebis)-2-oxazoline, 2,2′(tetramethylenebis)-2-oxazoline, 2,2′ethylenebis(oxyethylene)bis-2-oxazoline, and a bis-2-oxazoline of the formula

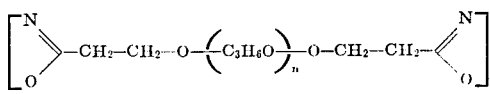

wherein $n$ has an average value of about 6.4.

3. The composition of claim 2 wherein said carboxylated polybutadiene has the formula

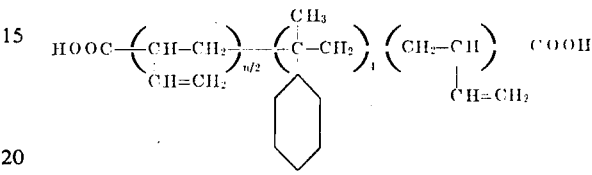

wherein the functionalized polybutadiene has a DP of from about 8 to 110.

* * * * *

UNITED STATES PATENT OFFICE
CERTIFICATE OF CORRECTION

Patent No. 3,673,274      Dated 27 June 1972

Inventor(s) Donald A. Tomalia and William K. Glesner

It is certified that error appears in the above-identified patent and that said Letters Patent are hereby corrected as shown below:

Column 7, delete the formula between lines 14 and 20 and insert the following:

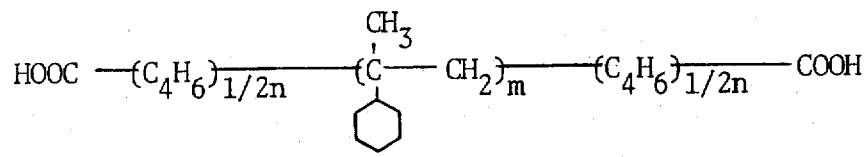

Column 8, add "n/2" to the formula between lines 14 and 20 so that it reads:

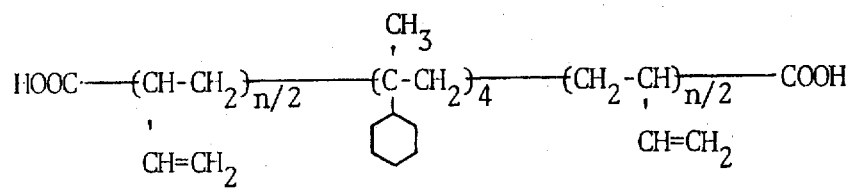

Signed and sealed this 6th day of February 1973.

(SEAL)
Attest:

EDWARD M. FLETCHER, JR.
Attesting Officer

ROBERT GOTTSCHALK
Commissioner of Patents